(12) United States Patent
Benesch et al.

(10) Patent No.: US 9,812,872 B2
(45) Date of Patent: Nov. 7, 2017

(54) METHOD FOR SYNCHRONIZING A FEED VOLTAGE WITH A NETWORK VOLTAGE

(71) Applicant: Siemens Aktiengesellschaft, München (DE)

(72) Inventors: Norbert Benesch, Heroldsberg (DE); Lutz Namyslo, Hausen (DE)

(73) Assignee: Siemens Aktiengesellschaft, München (DE)

( * ) Notice: Subject to any disclaimer, the term of this patent is extended or adjusted under 35 U.S.C. 154(b) by 556 days.

(21) Appl. No.: 14/380,318

(22) PCT Filed: Jan. 31, 2013

(86) PCT No.: PCT/EP2013/051918
§ 371 (c)(1),
(2) Date: Aug. 21, 2014

(87) PCT Pub. No.: WO2013/124133
PCT Pub. Date: Aug. 29, 2013

(65) Prior Publication Data
US 2015/0035366 A1 Feb. 5, 2015

(30) Foreign Application Priority Data
Feb. 22, 2012 (EP) .................................... 12156495

(51) Int. Cl.
*H02J 7/34* (2006.01)
*H02J 1/10* (2006.01)
(Continued)

(52) U.S. Cl.
CPC .................. *H02J 4/00* (2013.01); *H02J 3/00* (2013.01); *H02J 3/42* (2013.01); *G06F 19/00* (2013.01);
(Continued)

(58) Field of Classification Search
CPC ........ H02J 3/00; H02J 3/08; H02J 3/06; H02J 3/38; H02J 3/40; H02J 4/00; G06F 19/00;
(Continued)

(56) References Cited

U.S. PATENT DOCUMENTS 4,471,229 A * 9/1984 Plohn ...................... F01D 17/24
290/2
4,694,188 A * 9/1987 Diegel ................... F01D 17/04
290/40 B
(Continued)

FOREIGN PATENT DOCUMENTS

CN 101719679 A 6/2010
DE 102 10 099 A1 10/2003
(Continued)

*Primary Examiner* — Rexford Barnie
*Assistant Examiner* — Jagdeep Dhillon
(74) *Attorney, Agent, or Firm* — Henry M. Feiereisen LLC (57) ABSTRACT

In a method for synchronizing a feed voltage with a network voltage of an electrical energy supply network, a property of the feed voltage can be determined on the basis of a static characteristic curve. The static characteristic curve is compared to the property of the feed voltage of a feed power received by the electrical energy supply network at the applied feed voltage. The property of the feed voltage is adjusted to a specified value when a limit current of the feed power is reached.

16 Claims, 9 Drawing Sheets

(51) Int. Cl.
*H02J 3/38* (2006.01)
*H02J 4/00* (2006.01)
*H02J 3/00* (2006.01)
*H02J 3/42* (2006.01)
*G06F 19/00* (2011.01)

(52) U.S. Cl.
CPC ............... *H02J 3/383* (2013.01); *H02J 3/386* (2013.01); *Y02E 10/563* (2013.01); *Y02E 10/763* (2013.01); *Y10T 307/549* (2015.04)

(58) Field of Classification Search
CPC ....... G06F 1/30; G01R 19/2513; G01R 19/00; H02P 9/04; H04B 1/04; H04B 1/00
USPC .............. 307/52, 86, 87; 322/44; 455/114.3, 455/127.1, 127.3; 363/16; 702/66, 63; 700/286, 297, 295, 293; 290/44
See application file for complete search history.

(56) References Cited

U.S. PATENT DOCUMENTS

| | | |
|---|---|---|
| 8,116,108 B2 | 2/2012 | Becker et al. |
| 8,130,523 B2 | 3/2012 | Benesch |
| 2007/0150114 A1* | 6/2007 | Gardner .................... H02J 3/08 700/286 |
| 2009/0285002 A1 | 11/2009 | Benesch |
| 2010/0008115 A1 | 1/2010 | Benesch |
| 2010/0008118 A1 | 1/2010 | Becker et al. |
| 2011/0043045 A1* | 2/2011 | Qin .......................... H02J 3/08 307/85 |
| 2011/0077885 A1* | 3/2011 | Zweigle ............. G01R 19/2513 702/66 |
| 2011/0276192 A1* | 11/2011 | Ropp ...................... H02J 3/383 700/293 |
| 2012/0261917 A1* | 10/2012 | Egedal .................... F03D 7/026 290/44 |

FOREIGN PATENT DOCUMENTS

| | | |
|---|---|---|
| DE | 10 2006 059 199 B3 | 4/2008 |
| DE | 10 2010 001 333 A1 | 8/2011 |

\* cited by examiner

METHOD FOR SYNCHRONIZING A FEED VOLTAGE WITH A NETWORK VOLTAGE

CROSS-REFERENCE TO RELATED APPLICATIONS

This application is the U.S. National Stage of International Application No.PCT/EP2013/051918, filed Jan. 31, 2013, which designated the United States and has been published as International Publication No. WO 2013/124133and which claims the priority of European Patent Application, Serial No. 12156495.9, filed Feb. 22, 2012, pursuant to 35 U.S.C. 119(a)-(d).

BACKGROUND OF THE INVENTION

The invention relates to a method for maintaining a network voltage in an electrical energy supply network, a control device for performing the method, a network former for maintaining a network voltage in an electrical energy supply network and an electrical energy supply network with the network former.

Electrical energy supply networks with network formers for maintaining a network voltage in the electrical energy supply network are known for example from DE 102 10 099 A1. Every voltage is characterized by a shape, which can, for example, comprise the root-mean-square value, the frequency and the phase position.

SUMMARY OF THE INVENTION

It is the object of the invention to improve the maintenance of a network voltage in an electrical energy supply network.

The invention is based on the consideration that restarts, known as black starts, in electrical energy supply networks in standalone electrical energy supply networks, known as separate networks, represent a particular challenge. In the following, a black start should be understood to mean the ability of the separate network to establish a common network voltage from a switched-off state and maintain said voltage. To this end, during the black start, all network formers connected to the separate network have to find a common working point to establish a stable network voltage.

The invention is also based on the consideration that a differentiation is made between network formers and network supports in an electrical energy supply network. Here, in a first approximation, regardless of the state of the network, network supports feed an available power into the electrical energy supply network and hence function as a current source. On the other hand, network formers participate in the regulation of the network voltage and hence function as a voltage source. Here, the power output at the time is dependent on the electrical power requested by the electrical energy supply network at this time. At least one network former must be present in an electrical energy supply network. Stable operation of a plurality of network formers in an electrical energy supply network is preferably performed with the aid of a so-called static characteristic curve which compares electrical power requested by an electrical energy supply network with the network voltage. Every network former in the separate network uses these static characteristic curves to determine the voltage it is to feed in at the time. A mutually coordinated working point between a plurality of network formers is achieved in the electrical energy supply network when all network formers output the same voltage to be fed in.

The invention is also based on the consideration that it would be most favorable first to allow a individual network former to specify the network voltage and then to switch the remaining network formers to the electrical energy supply network. However, separate networks are characterized by a small hierarchy. Here, the network formers can only be switched jointly with the consumer loads. Although, here, it is still possible for an individual network former first to specify the network voltage, the connected consumers can cause the consumer load present during the black start to be too high for these individual network formers to generate the network voltage. This can only be rectified by performing the black start jointly with at least two coordinated network formers. This coordination could take place asynchronously wherein each of the network formers to be coordinated calculates the voltage to be fed into the network with reference to their own power being fed into the electrical energy supply network at the time via the static characteristic curve.

However, the invention is based on the knowledge that a common network voltage cannot be set using the asynchronous method when one of the coordinated network formers is not able to follow the other network formers quickly enough on its static characteristic curve. This should be explained by way of example with reference to network formers which have a current limit that they are not able to exceed. Since, as already mentioned, network formers work as voltage sources, they have to able to output infinitely high currents, but this is not the case in practice. At points on the static characteristic curve with very low voltages, the network formers have to compensate high power flows in the electrical energy supply network by correspondingly high currents. If it is not able to apply the correspondingly high current, its own power being fed into the electrical energy supply network at the time, and hence its voltage to be fed into the electrical energy supply network, remains constant so that it remains on a point of the static characteristic curve and does not move any further. The network formers to be coordinated are subsequently unable to establish a common network voltage.

Although this problem could be resolved using a synchronous method in that a common master fixes the desired values for the network voltage. This makes it possible to prevent the network formers from demanding excessive currents due to temporary network voltages that are too low. However, each individual network former would have to be connected to the master, which, with network formers distributed over areas measuring several kilometers, can result in significant costs, high susceptibility to faults and hence insufficient availability.

On the other hand is a concept of the invention to move the network former which has stopped still on its static characteristic curve and, so-to-speak, to give it a push so that it is again able to move on its static characteristic curve. This is achieved by the fact that, when the network former has stopped still on its static characteristic curve, it is pushed onto a new point on the static characteristic curve from which it has to output a current below its current limit for the power to be output. Hence, due to the now once again variable output current, it is able to increase the power it is to output to the electrical energy supply network and move freely on the static characteristic curve.

Therefore, the invention discloses a method for synchronizing a feed voltage with a network voltage of an electrical energy supply network, wherein a property of the feed voltage can be determined on the basis of a static characteristic curve, wherein the static characteristic curve compares the property of the feed voltage with a feed power, wherein the feed power is received by the electrical energy supply network at the applied feed voltage and wherein the property of the feed voltage is adjusted to a specified value when a limit for the feed power is reached. The properties of the feed voltage or the network voltage are, for example, the frequency, phase position and/or the root-mean-square value the corresponding voltage mentioned in the introduction.

The invention enables a common network voltage to be established asynchronously in an electrical energy supply network without individual network formers stopping still on their static characteristic curves. This enables, for example, costs to be saved during the establishment and operation of the electrical energy supply network due to less material and increased reliability. In one development of the invention, the limit for the feed power is reached when a maximum current to be output to the supply network is reached and/or the feed power is negative. This development is based on the consideration that, due to their semiconductor components, electronic components such as inverters and frequency converters have fixed current limits that cannot be exceeded.

In another development of the invention, the specified value is smaller than or equal to the corresponding property of the network voltage. This means that the actual value of the corresponding property of the network voltage can be used as the basis for the specified value. Namely, the specified voltage can be reselected in any way desired so that the network former is again able to move freely on the static characteristic curve. Therefore, it would be conceivable to calculate the specified voltage by interpolation of the last characteristic or to store an auxiliary value toward which the network former moves on the static characteristic curve internally in the network former. However, as a result of the suggested development, without further computer architecture, communication means or other internal storage requirements, a guide value is available on the network former by means of which the network former can align its point on the static characteristic curve in order to be able to move freely again.

In a preferred development of the invention, the static characteristic curve has a base which is displaced to adjust the property of the feed voltage to the specified value. The displacement of the base causes the feed power to be output by the network former carrying out the disclosed method to be reduced with the present properties of the feed power. As a result of this reduction, the network former is taken out of its power limit and can hence again move freely on its static characteristic curve.

In another development of the invention, to displace the base, a supplied primary energy from which the feed power is converted is reduced. The reduced primary energy feed automatically causes the feed power to be reduced so that no further reprogramming is required on the actual static characteristic curve.

In a particularly preferred way, the base of the static characteristic curve can be returned to its original value when the feed voltage is smaller than the limit for the feed power. In this way, after being freed from the power limit, the network former is again able to contribute to the voltage maintenance of network voltage predefined by a higher-ranking unit network voltage with respect to its frequency and its root-mean-square value.

In an alternative or additional development of the invention, the static characteristic curve is linear and has a pitch that is changed to adjust the property of the feed voltage to the specified value. In this way, the feed power of the network former can also be reduced with the present properties of its feed voltage so that the network former is taken out of its power limit.

In a particular development, the pitch of the static characteristic curve is returned to its original value when the feed voltage is smaller than the limit for the feed power.

In another development of the invention, the feed voltage is applied to the electrical energy supply network after the reception of a predetermined switch-on signal. This means that the switch-on signal triggers the black start from which the corresponding network former must move toward a point on its static characteristic curves with the desired properties for the network voltage. However, these desired properties do not have to be notified explicitly to the network former, instead, due to the course of the static characteristic curve of the electrical energy supply network, viewed from its feed point, it automatically moves into a point of equilibrium, in which the desired properties for the network voltage are specified. If the network former remains still on its static characteristic curve due to a specified power limit, it can be moved again with the disclosed method so that it is able to reach this state of equilibrium reliably. The switch-on signal enables all the network formers participating in the maintenance of the network voltage to be black started synchronously.

In a particular development, the switch-on signal is an increase in a property of the network voltage.

In another development of the invention, the disclosed method comprises the step of detecting a switch-on signal before the adjustment of the feed voltage to the feed power presently output to the supply network. The switch-on signal can be used to start all the network formers participating in the black start synchronously and synchronize them with each other via the electrical energy supply network without having to introduce an extra infrastructure for their communication between each other. This means it is sufficient for a master to be connected to one of the network formers which gives this network former the start signal. The network former started by the master can generate an initial voltage increase which can be measured by all the other network formers in order to join in the black start of the electrical energy supply network.

In a preferred development of the invention, the property of the feed voltage is sequentially controlled after the reception of the predetermined signal on the basis of a desired curve. In this way, the network formers participating in the maintenance of the network voltage can be brought to the above-mentioned point of equilibrium at a predeterminable speed on its characteristic curve, which reduces the probability of network formers ever remaining still on their static characteristic curves.

In a particularly preferred development of the invention, the sequentially controlled property of the feed voltage is the root-mean-square value of the feed voltage. The correspondingly regulated voltage increase is then the aforementioned voltage ramp, which occurs for example due to a slow parallel displacement of the reactive power characteristic curve of the corresponding network former during the black start. The regulated increase in the root-mean-square value of the voltage can influence changes to the individual feed voltage in the electrical energy supply network, which, due to induction currents, can result in corresponding disruptions in the electrical energy supply network.

In an alternative development, the desired curve is ramp-shaped.

In an additional development, a temporal length of the ramp shape is shorter than a transmission time of the switch-on signal. This means that the individual network formers, which are not connected to the master, should detect the voltage increase before the network formers connected to the master change to a stationary condition.

In an additional development of the invention, the disclosed method comprises the step of increasing the feed power to the electrical energy supply network on the basis of a desired shape for the network voltage. The desired shape for the network voltage can, for example, be specified by a master that exclusively communicates with a single network former in the electrical energy supply network. The disclosed invention then enables all other network formers to adjust their output voltage to the desired shape of the network voltage without any further communication means apart from the actual electrical energy transmission network being required for the synchronization of the individual network formers with each other.

In a particular development of the invention, the static characteristic curve comprises a reactive power static characteristic curve which compares the reactive power of the feed power to the root-mean-square value of the feed voltage. Since reactive power is a form of power which periodically pulses to and fro between an electrical energy generator and an electrical consumer, it is required to operate asynchronous motors, for example. Feeding reactive power to the electrical energy supply network enables the amplitude, and hence the root-mean-square value, of the network voltage to be influenced since the supplied reactive power generates induction currents in the network, which influence the network voltage.

In a preferred development of the invention, the disclosed method comprises the step of displacing the reactive power static characteristic curve to increase the feed power to the electrical energy supply network. The displacement of the reactive power static characteristic curve and the associated influence on the feed voltage can generate a voltage ramp. A defined displacement of the reactive power static characteristic curve over time enables the shape of the voltage ramp over time to be adjusted to a predefined shape.

In another development of the invention, the static characteristic curve comprises an active power static characteristic curve which compares the active power of the feed power to the frequency of the feed voltage and which is kept constant during the increase of the feed power to the electrical energy supply network. In the case of a generator, the active power depends on the product of angular velocity and torque. This generator behavior can be imposed upon every network former, such as, for example, an inverter with an attached solar cell, by suitable control loops so that the network frequency of the supply network can be kept constant by the control system via the active power supplied to the supply network.

The invention also discloses a control device for performing the disclosed method.

In one development, the disclosed control device comprises a memory and a processor. In this case, the method is stored in the memory in the form of a computer program and the processor is provided to carry out the method when the computer program is loaded from the memory into the processor.

The invention also discloses a network former for an electrical power network which comprises an electrical energy generator for outputting a feed voltage into an electrical energy supply network with a network voltage and a disclosed control device.

In one development, the disclosed network former comprises an energy store for receiving electrical energy from the supply network. The energy store enables the network former in the electrical power network or electrical energy supply network also to function as a consumer and receive electrical energy if this should be necessary.

In one particular development, the energy generator is an inverter, which is embodied to convert electrical energy from a DC source into the feed voltage.

The invention also discloses an electrical energy supply network comprising a network former for outputting electrical feed voltages for forming a network voltage and electrical consumers for receiving the network voltage. In this case, at least one network former is embodied like the above-disclosed network former.

In one development of the invention, all network formers are embodied like the disclosed network former.

BRIEF DESCRIPTION OF THE DRAWING

The above-described properties, features and advantages of this invention and the way in which these are achieved will be explained in a clearer and easier-to-understand way in connection with the following description of the exemplary embodiments, which are explained in more detail with reference to the drawings, which show in:

FIG. 2 a part of the electrical energy supply network as shown in FIG. 1, FIG. 3 an active power static characteristic curve of an electrical energy generator as shown in FIG. 2, FIG. 4 a reactive power static characteristic curve of an electrical energy generator as shown in FIG. 2, FIG. 5 the reactive power static characteristic curve as shown in FIG. 4 during a black start of the electrical energy supply network as shown in FIG. 1, FIG. 6 a detail of the active power static characteristic curve as shown in FIG. 2, FIG. 7 a detail of the electrical energy supply network as shown in FIG. 1, FIG. 8 a first exemplary embodiment of the device as shown in FIG. 6, FIG. 9 a second exemplary embodiment of the device as shown in FIG. 6, FIG. 10 a third exemplary embodiment of the device as shown in FIG. 6, FIG. 11 a fourth embodiment of the device as shown in FIG. 6, and FIG. 12 an exemplary embodiment of a method according to the invention.

DETAILED DESCRIPTION OF PREFERRED EMBODIMENTS

In the figures, the same elements are given the same reference numbers and only described once.

Figure 1:
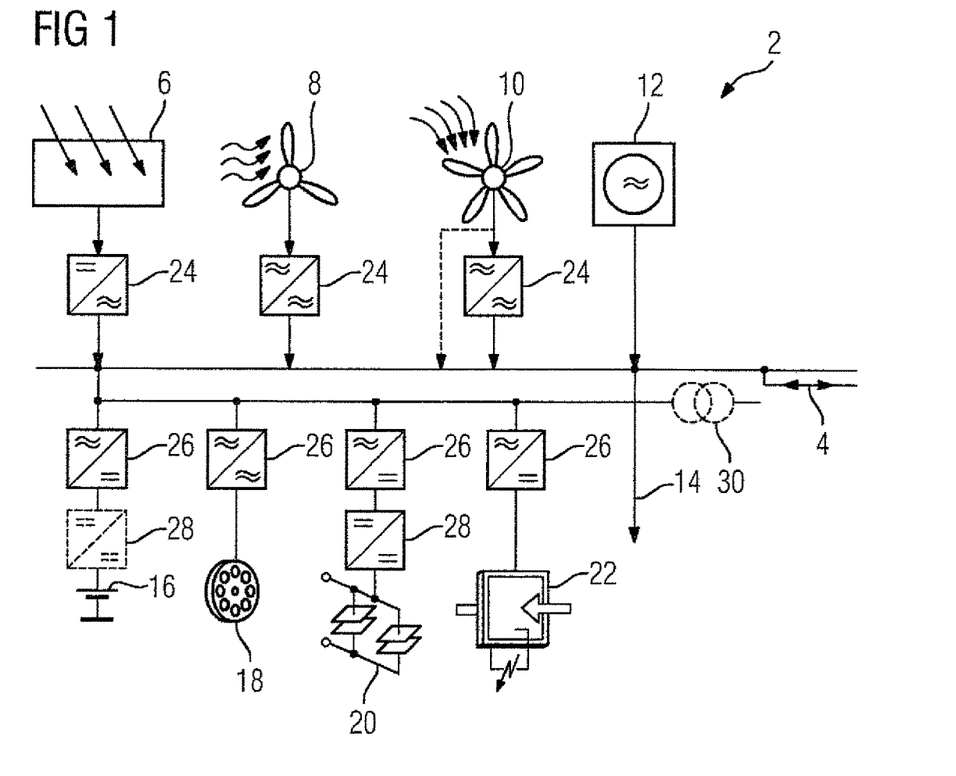
FIG. 1 a block diagram of an electrical energy supply network.

FIG. 1 shows a block diagram of an electrical energy supply network 2.

In the present embodiment, the electrical energy supply network 2 is embodied as a separate network 2, which, although it is connected to a central interconnected network 4, in regular operation, can be operated fully independently therefrom.

The separate network 2 can be supplied with electrical energy from various electrical power sources. In the present embodiment, the electrical power sources comprise a solar cell 6, a wind wheel 8, a water wheel 10 and a diesel generator 12. The electrical energy from the electrical power sources can be output in the direction 14 of one or more consumers 15 shown in FIG. 2. If the electrical power input by the electrical power sources is greater than the amount the consumer 15 is able to receive, excess electrical energy can be buffered in energy stores. In the present embodiment, the energy stores comprise an accumulator 16, a flywheel 18 and a double-layer capacitor 20. Moreover, a fuel cell 22 is also provided as an electrical power source. If the electrical power requirement of the consumers 15 temporarily exceeds the electrical energy supply from the electrical power sources, excess electrical energy stored in the energy stores can be requested again.

In the following, it is assumed that during the output of electrical energy to the separate network 2, all electrical power sources 6, 8, 10, 12 are operated as network formers and all electrical energy stores 16, 18, 20, 22 are operated as network supports.

Figure 2:
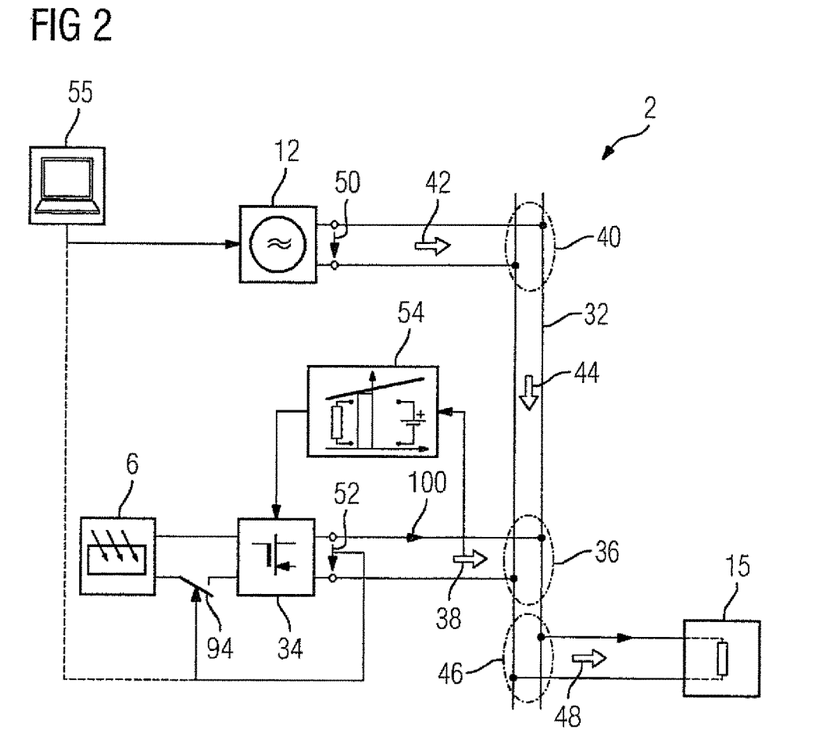
Figure 3:
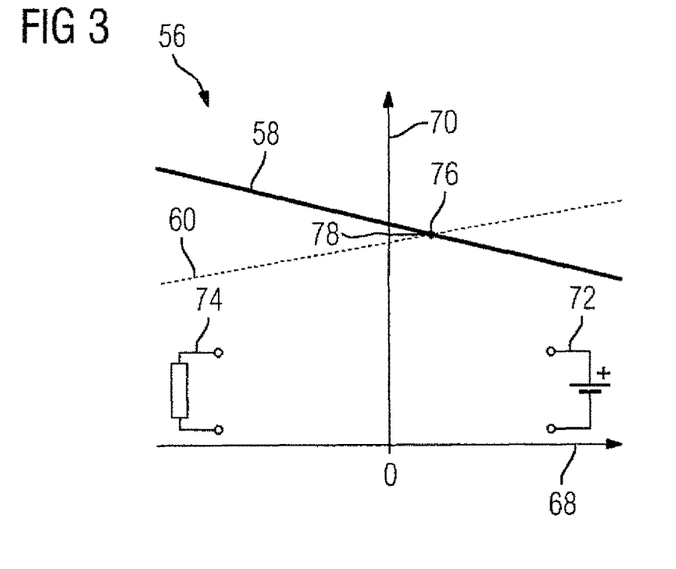
Figure 4:
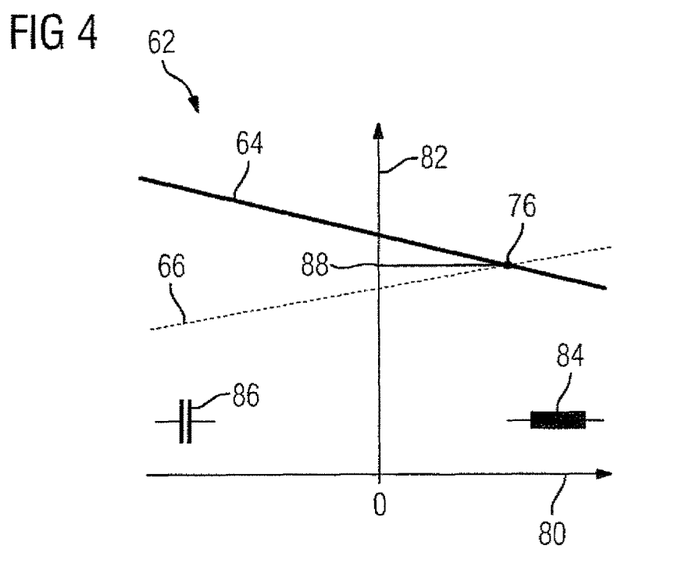

The network formers 6, 8, 10, 12 regulate the network voltage of the separate network 2 on the basis of static characteristic curves shown in FIGS. 3 and 4. These compare the shape of the network voltage with the electrical power requested by the separate network 2. While the static characteristic curves are predetermined intrinsically for the diesel generator 12, power converters 24 correspondingly regulated in accordance with the network status have to be connected downstream of the solar cell 6, the wind wheel 8 and the water wheel 10 and these impose corresponding static characteristic curves on these electrical power sources; this will be dealt with in greater detail in the context of FIG. 2. If, for example, a water flow can be regulated by the water wheel 10, for example with butterfly valves and bypass valves, as indicated in FIG. 1 by a dashed line, it may be possible to dispense with an extra self-commutated power converter 24.

In a first approximation, regardless of the condition of the separate network 2, the network supports 16, 18, 20, 22 feed their presently available power into the separate network 2. To this end, in the present embodiment, power converters 26 correspondingly regulated in accordance with the available feed power are connected downstream of the network supports 16, 18, 20, 22. DC to DC converters 28 can be connected downstream of both the accumulator 16 and the double-layer capacitor 20 in order to compensate voltage fluctuations in these two energy stores depending on their charging condition.

While the network supports 16, 18, 20, 22 function as current sources in the separate network 2, the network formers 6, 8, 10, 12 function as voltage sources.

The separate network 2 can be connected to further (not shown) separate networks 2 via a transformer 30.

For the further illustration of the exemplary embodiment, the separate network 2 is simplified in the following and explained with reference to a two-phase electrical energy supply. However, all the following statements can be expanded to as many phases as wanted in a way known to the person skilled in the art.

In the simplified separate network 2, only the solar cell 6 and the diesel generator 12 are connected via a grid 32 to the consumer 15. The self-commutated power converter 24 of the solar cell 6 is an inverter 34. Since every self-commutated power converter 24 outputting alternating voltage as a rule comprises an inverter, the statements made below with respect to the inverter 34 can be transferred to all self-commutated power converters 24 shown in the separate network 2 in FIG. 1. While the inverter 34 and the diesel generator 12 each feed an electrical inverter power 38 into the grid 32 at an inverter connection point 36 and electrical generator power 42 at an generator connection point 40 and so maintain an electrical power output 44, the consumer 15 draws an electrical consumer power 48 from the grid 32 at a consumer connection point 46.

Since the solar cell 6 and the diesel generator 12 are operated as network formers, the inverter power 38 and the generator power 42 must be synchronized with one another in order to prevent the inverter 34 and the generator 12 from exchanging electrical power between one another and functioning as electrical consumers with respect to one another.

The dependence of the generator voltage 50 on the generator power 42 can be used for the synchronization of the inverter power 38 and the generator power 42. For example, the frequency of the generator voltage 50 drops as the effective component in the generator power 42 increases, or the root-mean-square value of the generator voltage 50 drops as the with an increasing reactive component in the generator power 42. This dependence is modeled in the above-mentioned static characteristic curves. If a plurality of electrical energy generators with an output voltage which is dependent on the output power in this way is coupled to one or a plurality of consumers, a stable working point with a stable output voltage at which every individual electrical energy generator outputs electrical power and only the electrical consumer or consumers receive electrical power is established.

Since the inverter voltage 52 is in principle not dependent on the inverter power 38, as already indicated, it has to be made artificially dependent on the inverter power 14. This is achieved in that inverter static characteristic curves are defined for the inverter 34 and, as indicated in FIG. 2, the inverter voltage 52 is made dependent upon the inverter power 38 via correspondingly inverted inverter static characteristic curves 54. In this way, the inverter 34 behaves like the generator 12 and can be synchronized therewith via the static characteristic curves in the electrical energy supply network. Hence, it is not the solar cell 6 that functions as the actual network former but the inverter 34 connected thereto and therefore essentially it is only necessary to take the inverter 34 into account.

The diesel generator 12 and/or the inverter 34 with its inverted static characteristic curves 54 can be controlled by a master computer 55; this will be dealt with at a later stage.

Before dealing with synchronization in the detail, there will now be a brief further explanation of the static characteristic curves.

FIG. 3 is an active power diagram 56 with: an inverter active power static characteristic curve 58 and a grid active power static characteristic curve 60 viewed from the inverter 34. In addition, FIG. 4 is a reactive power diagram 62 with an inverter reactive power static characteristic curve 64 and a grid reactive power static characteristic curve 66 viewed from the inverter 34.

For any two-terminal network, an active power diagram compares the active power 68 of the frequency 70 output or received by the two-terminal network to its voltage output or received. If the active power 68 is positive, the two-terminal network functions as a generator 72. If the active power 68 is negative, the two-terminal network functions as a consumer 74.

As mentioned above, the inverter active power static characteristic curve 58 is predefined. The grid active power static characteristic curve 60 represents the behavior of the grid 4 viewed from the inverter 34 and is dependent on a (not shown) diesel generator active power static characteristic curve, the impedance of the consumer 15 and the impedance of the grid 32. During operation, when the inverter 34 and the grid 32 viewed from the inverter 34 are connected to one another, the inverter working point 76 at which the inverter active power static characteristic curve 58 and the grid active power static characteristic curve 60 intersect is established between the inverter power 38 and the electrical power received by power network 32 at the inverter connection point 36. The inverter working point 76 specifies the network frequency 78 of the common network voltage.

In addition, the reactive power diagram 62 compares for any two-terminal network the reactive power 80 output or received from the two-terminal network to the root-mean-square value 82 of its output or received voltage. If the reactive power 80 is positive, the two-terminal network functions as an inductance 84. If the reactive power 80 is negative, the two-terminal network functions as a capacitance 86.

The inverter reactive power static characteristic curve 64 is also specified. The grid reactive power static characteristic curve 66 again represents the behavior of the grid 32 viewed from the inverter 34 and is dependent on a (not shown) diesel generator reactive power static characteristic curve, the impedance of the consumer 15 and the impedance of the grid 32.

If the inverter 34 and the grid 32 viewed from the inverter 34 are connected to one another, the network root-mean-square value 88 of the common network voltage can be read from the point of intersection between the inverter reactive power static characteristic curve 64 and the grid reactive power static characteristic curve 66.

The following refers again to the synchronization of the inverter power 38 and the generator power 42.

Figure 5:
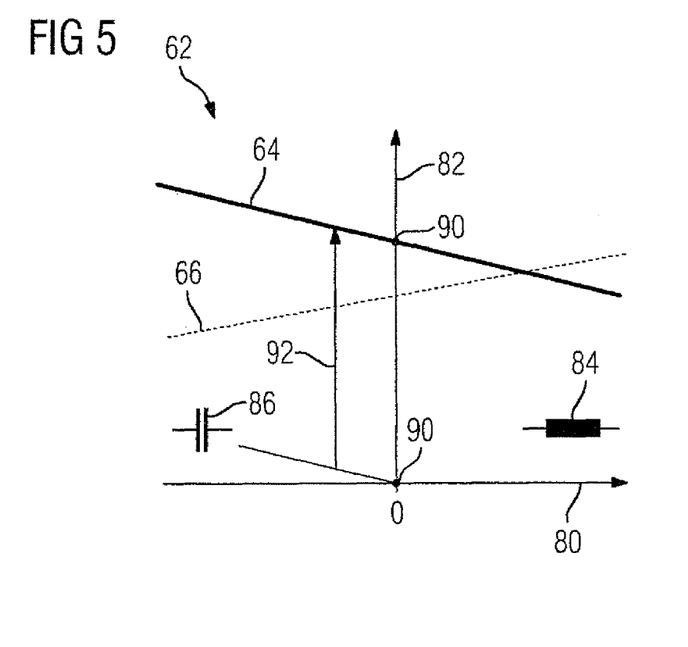

At the start of the electrical power output by the diesel generator 12 and by the inverter 34, when no chemical energy in the form of diesel is fed any longer to the diesel generator 12 and no electrical energy from the solar cell 6 is fed any longer to the inverter 34, all their corresponding static characteristic curves pass through the origin of the coordinates of the static characteristic curves diagram, as shown in FIG. 5 by way of example with reference to the reactive power static characteristic curve 64 of the inverter 34. The no-load voltage 90, which means the inverter voltage 52 or the diesel generator voltage 50 in unloaded state, is therefore also zero so that no electrical power 38, 42 can be output to the electrical consumer 15.

For the electrical power output, chemical energy in the form of diesel is fed to the diesel generator 12 and electrical energy from the solar cell 6 is fed to the inverter 34. This external energy supply 92 raises the no-load voltage 90 and hence the static characteristic curve (in FIG. 5 the reactive power static characteristic curve 64) of the inverter 34 and the diesel generator 12 and in this way facilitates the output of electrical power 38, 42 to the consumer 15. If the electrical consumer 15 is connected to the electrical energy supply network 2, the aforementioned working point 76 is established between the diesel generator 12, the inverter 34 and the electrical consumer 15.

In order to start the electrical power output, it is, for example, possible for the master computer 55 to start the combustion process in the diesel generator 12 and switch it on in this way. Starting the diesel generator 12 causes a voltage ramp in the electrical energy supply network 2 which can be used to start the electrical power output of the inverter 34. To this end, the inverter 34 is connected to the solar cell 6 via a switch 94 that can be controlled via the inverter voltage 52 at the inverter connection point 36. As soon as the inverter voltage 52 exceeds a specified threshold value, the switch is closed and the electrical energy supply of the inverter 34 from the solar cell 6 started.

Alternatively, as indicated in FIG. 2 with a dashed line, the switch 94 can also be controlled via the master computer 55, wherein the diesel generator 12 is switched-on on the basis of the generator voltage 50 at the generator connection point 40.

As a further alternative, the diesel generator 12 and the switch 94 can both be controlled by the master computer, as indicated in FIG. 2 by a dashed line.

The communication between the master computer 55 and the diesel generator 12 and/or the switch 94 can take place via separate lines, as shown in FIG. 2. However, alternatively, the master computer 55 can also transmit its signals via the electrical energy supply network 2 and overlay the electrical grid output 44.

If the diesel generator 12 and the inverter 34 jointly feed electrical power 42, 38 into the electrical energy supply network 2, as mentioned above, both network formers must synchronize with one another in order to not to exchange any power with one another. However, this synchronization requires the inverter 34 and the diesel generator 12 to be able to move freely on their static characteristic curves 58, 64. However, the inverter 34 can only output electrical current at a particular level and therefore, particularly at low voltages at the start of the electrical power output, the inverter 34 has a low electrical power limit and is not able to move freely on its static characteristic curves. This prevents synchronization of the diesel generator 12 and the inverter 34 and will be explained briefly below with reference to FIG. 6 that shows a detail 96 of the [electrical energy generator] from the active power diagram in FIG. 3.

Figure 6:
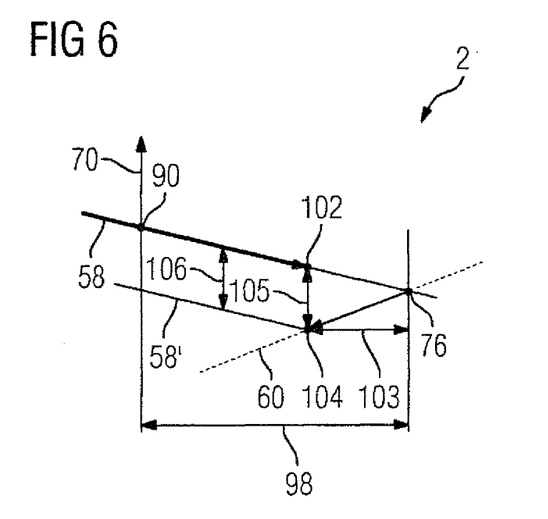

At the start of the electrical power output, the inverter 34 is at the point of no-load voltage 90.

After the start of the electrical energy supply has been triggered by the master computer 55, if the inverter 34 and diesel generator 12 are both feeding electrical power 38, 42 into the electrical energy supply network 2, viewed from the inverter 34, the grid active power static characteristic curve 60 dependent on the generator 8 and both characteristic curves intersect at the inverter working point 76. In order to move to the inverter working point 76, the inverter 34 has to provide additional active power 98. However, since the network voltage at the inverter 6 is very low at the start of the electrical energy supply, the additional active power 98 can substantially only be provided via the inverter current 100 shown in FIG. 2, but this is also limited by the current limit of the inverter 34. Subsequently, the inverter 34 stays still on its inverter active power characteristic curve 58 before the inverter working point 76 at a limit working point 102.

On the other hand, the diesel generator 12 can optionally move freely on its generator active power static characteristic curve toward the inverter working point 76 until it is switched off. Since the inverter 6 cannot follow the generator 8, viewed from the inverter working point 76, the generator moves back again on its generator active power static characteristic curve again in order to provide an active power difference 103 absent in the inverter 34. Viewed from the inverter 6, in this way the grid 4 adopts a compensating working point 104 on the grid active power static characteristic curve 40. Subsequently, the inverter 34 outputs an inverter voltage 52 which has a frequency 70 with a frequency difference 105 to the network voltage.

The situation with reference to the reactive power static characteristic curves 64, 66 appears similar. The situation intensifies further since, when the inverter 34 is operated at its current limit $I_{max}$, the active power static characteristic curve 58 and the reactive power static characteristic curve 64 of the inverter 34 are mixed together and the active current $I_P$ of the inverter 34 and the reactive current $I_Q$ of the inverter 34 are coupled together via the total current $I_{ges}$ as follows:

$$I_\downarrow P = \sqrt{(I_\downarrow\max^\uparrow 2 - I_\downarrow Q^\uparrow 2)}$$

In order to resolve this problem, the invention proposes that, in the case of a synchronization problem, the inverter voltage 52 be changed such that the inverter 34 is again able to move freely on its static characteristic curves 58, 64. To this end, the electrical energy input to the inverter 34 from the solar cell 6 could be reduced. This has the effect that the static characteristic curves 58, 64 of the inverter 34 are negatively displaced by a defined amount 106. If the static characteristic curves 58, 64 of the inverter 34 are, for example, displaced for a long enough time that they pass through the present compensating working point 104 of the grid, the inverter 34 can again move freely on its static characteristic curves 58, 64. Subsequently, the static characteristic curves 58, 64 of the inverter 34, and hence the power input from the solar cell 6, could be slowly raised again in order to set the network voltage actually specified by the master 55. In the simplest case, the change in the static characteristic curve 58, 64 can be achieved in that, for the duration of the depression of the static characteristic curve 58, 64, the inverter 34 follows the network voltage and hence the present compensating working point 104 of the grid 32. Alternatively or additionally, the pitch of the static characteristic curves 58, 64 of the inverter 34 could also be changed for a short time.

Figure 7:
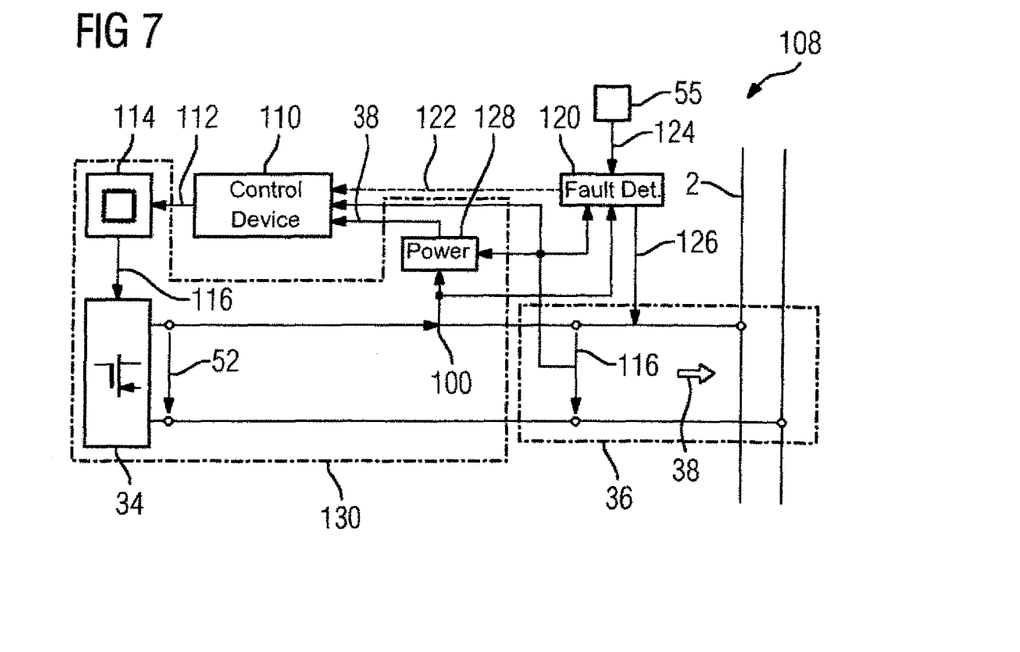

FIG. 7 shows a detail 108 from the electrical energy supply network 2 as shown in FIG. 2 with a device 110 for controlling the inverter 34. In the following, the inverter 34 is a self-commutated inverter.

The device 110 can, on the basis of the inverter power 38 fed into the grid 2, output an actuating signal 112 to a control processor 114 of the inverter 34, which, again based on the actuating signal 112, can output clock signals 116 to (not shown) switches of the inverter 34, with which the inverter 34 generates the inverter voltage 52.

The device 110 switches the operation of the inverter 34 to and fro between a closed-loop control mode and a fault mode. As long as there are no synchronization problems, in closed-loop control mode, the inverter 34 can contribute to keeping the network voltage 118 in the grid 2 constant. If there are synchronization problems, the inverter 34 should follow the network voltage 118.

To switch between closed-loop control mode and fault mode, a fault-detection appliance 120 of the device 110 can monitor the inverter connection point 36 for synchronization problems and send the device a corresponding state signal 122. The following lists some criteria for the detection of a synchronization problem. The more often these criteria are included in the detection of a synchronization problem, the more reliable the monitoring and the less frequently the inverter 34 are erroneously transferred into fault mode.

As the first criterion, the fault-detection appliance 120 can check whether an inverter current 100 has reached its maximum current $I_{ges}$.

Alternatively or additionally, the fault-detection appliance 120 can check whether there is presently a short circuit in the grid 4. This can be performed, for example, by monitoring the level of the network voltage 118 and comparing it to a threshold value. In the event of a short circuit, the network voltage 118 falls below the threshold value.

Again alternatively or additionally, the fault-detection appliance 120 can check whether the inverter 34 is presently connected to the grid 2 as the sole electrical energy generating unit.

To this end, the fault-detection appliance 120 can, for example, receive a parameterization signal 124 from the master 55 from which it may be derived how many electrical energy generating units are connected to the grid 2.

Alternatively or additionally, in closed-loop control mode, the fault-detection appliance 120 can feed a fault 126 into the grid 4 and in this way specifically divert the inverter 34 from the inverter working point 76. If the power output 20 changes significantly according to the introduced fault 126, it may be assumed that the reaction is induced by a further generator unit with static characteristic curve behavior.

Suggested faults 126 are preferably abrupt and sinusoidal currents or voltages the amplitude of which must not result in violation of the permissible tolerance limits for the network voltage 118. In addition, the time behavior must be adjusted to the dominant time constant of the generator 12 in order to bring about a frequency-voltage reaction therein.

In FIG. 7, the inverter power 38 is detected via a power-measuring device 128 on the basis of the network voltage 118 and the inverter current 100.

The device 124 is described in more detail below with reference to four exemplary embodiments. To simplify the further descriptions, the control processor 114, the inverter 34 and the power-measuring device 128 are combined to form controlled system 130 which is controlled by the device 110 via the actuating signal 112.

Figure 8:
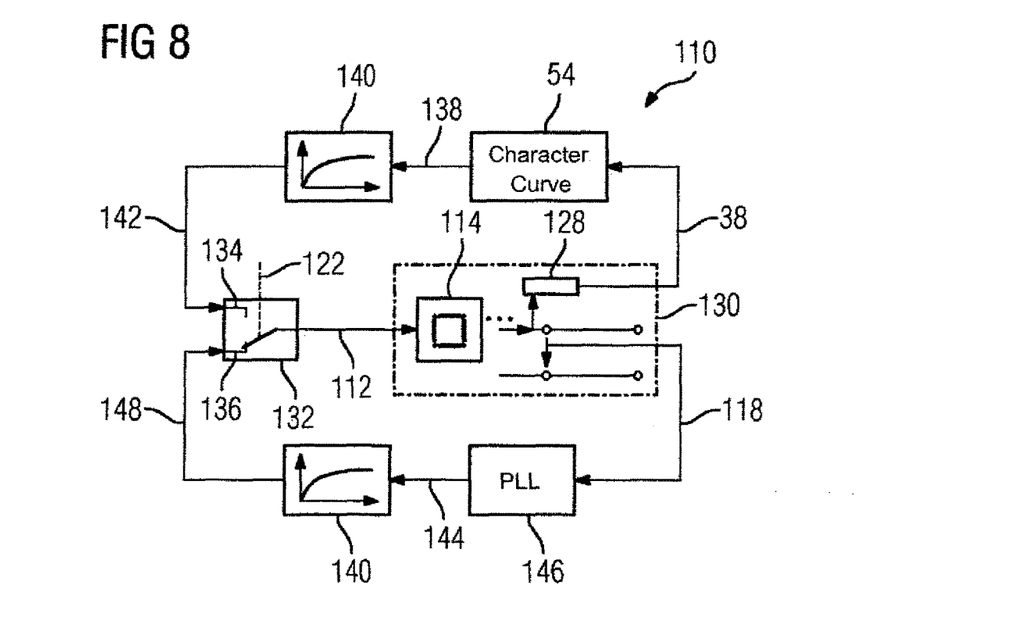

FIG. 8 shows the first exemplary embodiment of the device 110.

A switch 132 that can be controlled by the state signal 122 indicates in which of the two operating modes the inverter 34 of the controlled system 130 is to be controlled. To this end, the switch 132 can be transferred to a setting for closed-loop control mode 134 and a setting for fault mode 136.

In closed-loop control mode 134, as shown in FIG. 2, the inverter 34 is controlled via the inverted inverter static characteristic curve 54 with a control signal such that the inverter 34 adjusts to a predefined static behavior and so contributes actively to the maintenance of a constant network voltage 118. Since, in this case, the inverter 34 has to output a specified inverter power 38 into the grid 2, in closed-loop control mode 134, the control signal should be described as a power control signal 138. A low-pass filter 140 with PTI behavior can be used to damp fluctuations from the power control signal 138, which, for example, originate from noise. In closed-loop control mode 134, the low-pass filtered power control signal 142 is finally output as the actuating signal 112 to the control processor 114 in order to set the inverter voltage 52.

In fault mode 136, the controlled system 130 is controlled by a control signal such that the inverter voltage 52 follows the network voltage 118. Therefore, in fault mode, the control signal should be described as a sequential control signal 144. The sequential control signal 144 can, for example, be derived from the network voltage 118 via a phase-locked loop 146, called PLL 146, in a way known to the person skilled in the art in order to stabilize the sequential control signal 144. A further low-pass filter 140 can again be used to damp fluctuations in the sequential control signal 144 wherein the low-pass filtered sequential control signal 148 is output as the actuating signal 126 to the control processor 128.

Figure 9:
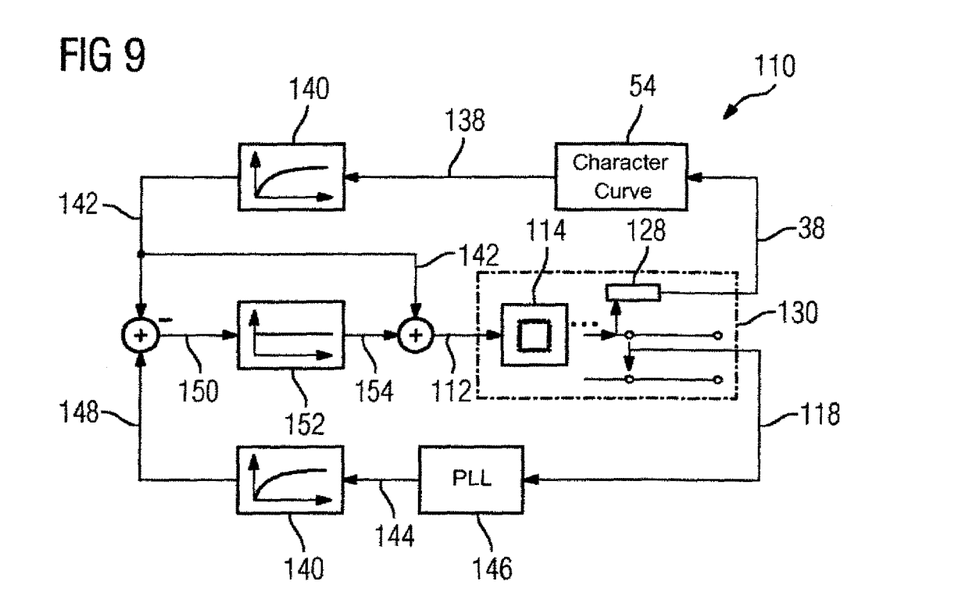

FIG. 9 shows the second exemplary embodiment of the device 110.

In the second exemplary embodiment, the low-pass filtered power control signal 142 can be extracted from the low-pass filtered sequential control signal 148. The resulting deviation 150 can be fed to a regulator 152. By using the switch 132 shown in FIG. 8, in fault mode 136, a resulting control signal 154 can be output (in a way not shown) directly to the control processor 114 as an actuating signal 112. In this way, the low-pass filtered sequential control signal 148, and hence the network voltage 118, sets a reference variable for the inverter voltage 52. In closed-loop control mode 134, in a way similar to that in FIG. 8, the low-pass filtered power control signal 142 can then be output as an actuating signal 112.

As shown in FIG. 9, however, the low-pass filtered power control signal 142 can also be applied to the control signal 154. This causes the inverter voltage 52 to be set to be derived directly from the actuating signal 112.

In this way, it is possible to switch continuously between the closed-loop control mode range 134 and the error mode range 136 without jumps. If the regulator 152 has, for example, P-behavior, the regulator 152 can output a weighting factor for the deviation 150 which specifies the speed of the adjustment of the inverter voltage 52 to the network voltage 118.

If the amplification factor is exactly 0, the deviation 150 is completely suppressed so that only the low-pass filtered power control signal 142 is output as an actuating signal 112. Therefore, the amplification factor of exactly 0 replaces the switch 132 in the setting for closed-loop control mode 134.

With an amplification factor of exactly 1, the low-pass filtered sequential control signal 148 is output, since the low-pass filtered power control signal 142 is increased by the negative intrusion before the regulator 152 and the positive intrusion after the regulator 152 at this amplification factor. Therefore, the amplification factor of exactly 1 replaces the switch 132 in the setting for fault mode 136.

If values between 0 and 1 are selected for the amplification factor of the regulator 152, it is hence possible for the regulator 152 to switch continuously and without jumps from closed-loop control mode 134 to fault mode 136 and vice versa.

Figure 10:
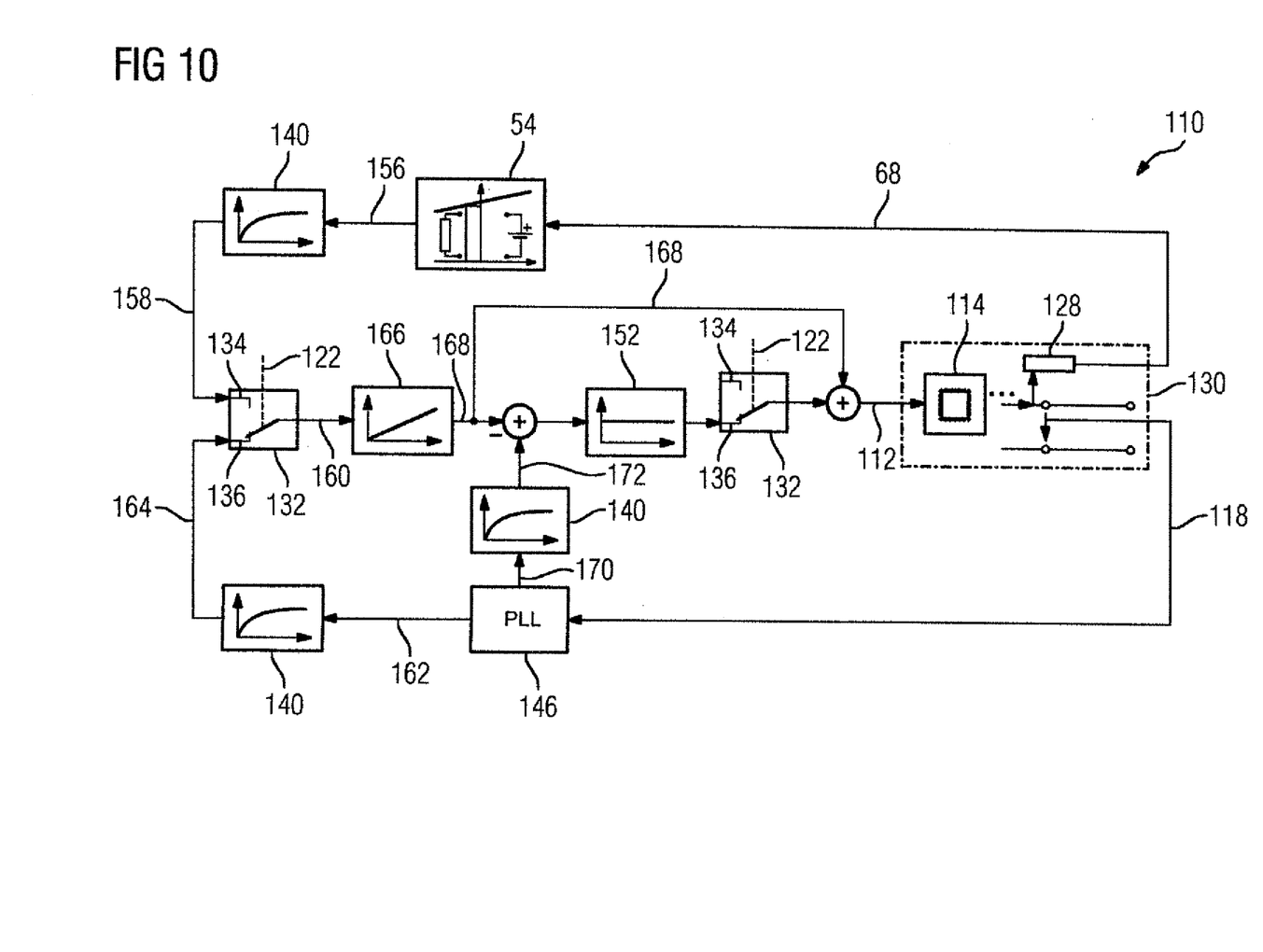

In the third exemplary embodiment, it is optionally possible to dispense with the use of the switch 132 completely. If, nevertheless, the switch is used after the regulator 152, the regulator 152 can also be parameterized invariably and the speed of the adjustment of the inverter voltage 52 to the network voltage 118 fixed in advance.

FIG. 10 shows the third exemplary embodiment for calculating the actuating signal 126 which is used to set the frequency of the inverter voltage on the basis of the inverted inverter active power static characteristic curve 38.

In the third exemplary embodiment, the power-measuring device 144 detects the active power 68 of the inverter power 38 on the basis of the network voltage 118, the inverter current 100 and the phase displacement between the two variables. The inverted inverter active power static characteristic curve 54 is used to determine the drive frequency, which the inverter 34 has to set to fulfill its predefined active power statics in order to make an active contribution to the frequency maintenance in the network voltage 118. This drive frequency is designated power frequency 156 in the following similarly to in FIG. 8. The power frequency 158, which is low-pass filtered similarly to FIG. 8, is output via a switch 132 similar to FIG. 8 in closed-loop control mode 134 as an actuating frequency 160 for the inverter voltage 52. The present network frequency 162 can be derived from the PLL 146. In fault mode 136, the network frequency 165, which is low-pass filtered similarly to FIG. 8, can be output as an actuating frequency 160 for the inverter voltage 52.

An integrator 166 can convert the actuating frequency 160 into an inverter voltage phase 168 for the inverter voltage 52. A network voltage phase 170 can then be derived from the PLL 146 and low-pass filtered. The low-pass filtered network voltage phase 172 and the inverter voltage phase 168 can then be processed to form the actuating signal 112 exactly like the low-pass filtered power voltage 142 and the low-pass filtered sequential voltage 148 in FIG. 9.

FIG. 10 shows the switch 132 after the regulator 152 which enables the regulator 152 to be parameterized invariably in advance.

Figure 11:
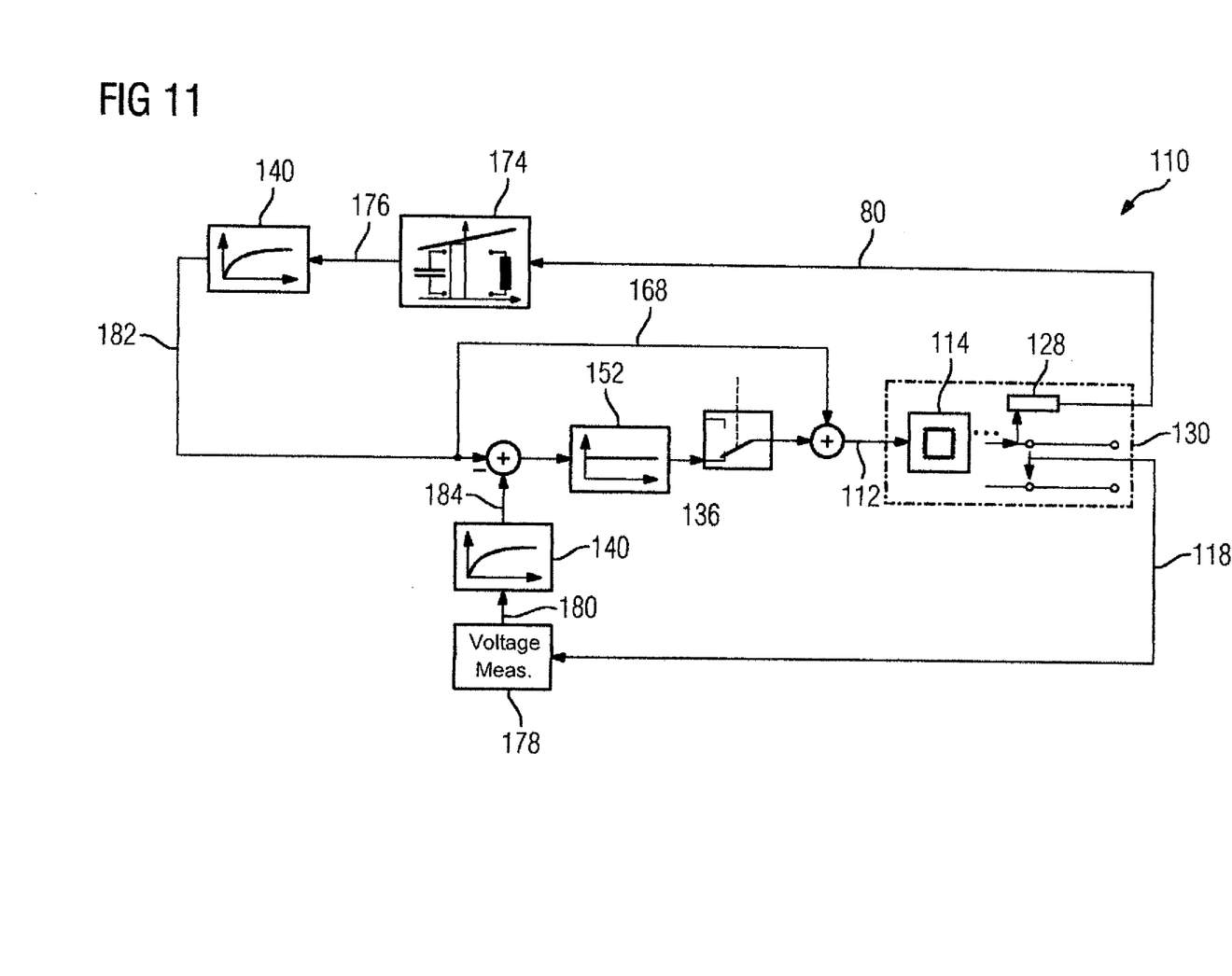

FIG. 11 shows the fourth exemplary embodiment for calculating the actuating signal 112 which is used to set the root-mean-square value of the inverter voltage 52 on the basis of an inverted inverter reactive power static characteristic curve 174.

The power-measuring device 128 detects reactive power 80 output by the inverter 34. The inverted inverter reactive power static characteristic curve 174 outputs the inverter root-mean-square value 176 required for the inverter voltage 52 so the inverter 34 follows its predefined reactive power statics. The inverter root-mean-square value 176 is finally low-pass filtered.

A voltage measuring device 178 can be used to determine the network voltage root-mean-square value 180, which is also low-pass filtered.

The low-pass filtered inverter root-mean-square value 182 and the low-pass filtered network voltage root-mean-square value 184 are then processed to form the actuating signal 112 exactly like the low-pass filtered power voltage 142 and the low-pass filtered sequential voltage 148 in FIG. 9.

FIG. 11 also shows the switch 132 after the regulator 152 which enables the regulator 152 to be parameterized invariably in advance.

Figure 12:
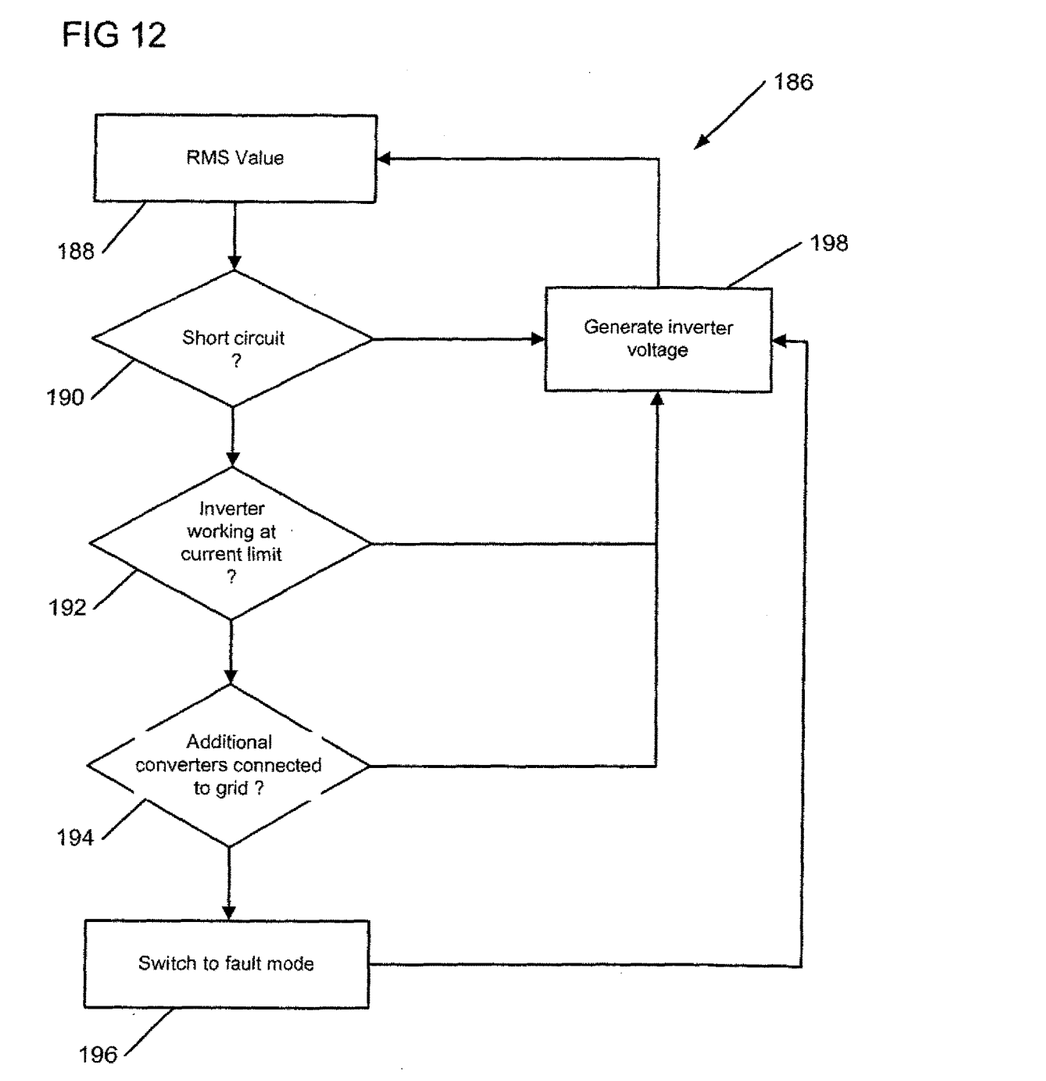

FIG. 12 shows by way of example a method 186 for switching between closed-loop control mode 134 and fault mode 136.

The method starts in step 188 with the root-mean-square value 176, the frequency 156 and the phase 168 for the inverter voltage 52 being determined from the inverted static characteristic curves 52, 174. In steps 190, 192 and 194, the above-described conditions for generating the state signal 122 are checked one after the other.

While it is checked in step 190 whether a short circuit is present, in step 192 it is checked whether the inverter 34 is not yet working at its inverter current limit $I_{ges}$ and in step 194 whether no further energy generators are connected to the grid 2.

If the answer to any of checking steps 190-194 is yes, the inverter voltage 52 is generated in step 198 in closed-loop control mode 134 on the basis of the root-mean-square value 176, the frequency 156 and the phase 158 from step 188. Otherwise, the method 186 changes in step 196 to fault mode 136 and generates the inverter voltage 54 on the basis of the root-mean-square value 176, the frequency 156 and the phase 158 of the network voltage 118.

It is possible to check in step 196 when one of the conditions from steps 190 to 194 is fulfilled in order to change to the method 186 in step 198. In this way, the inverter voltage 52 in fault mode 136 is corrected so that the inverter 34 can actively contribute again in a timely manner to the maintenance of the network voltage 118. Alternatively, the method 186 can be automatically transferred to step 198 after a specified time.

Although the invention was illustrated and described in more detail by the preferred exemplary embodiment, the invention is not restricted by the disclosed examples and other variations can be derived by the person skilled in the art without departing from the scope of the invention.

The invention claimed is:

1. A method for synchronizing a feed voltage of a first current-limited network former with a network voltage of an electrical energy supply network comprising additional second network formers having second static characteristic curves and electrical loads, the method comprising:
   determining, based on a first static characteristic curve of the first network former, a property of the feed voltage of the first network former, said property selected from frequency, phase position and root-mean-square value,
   comparing with the first static characteristic curve of the first network former the determined property of the feed voltage of the first network former with a feed power of the first network former,
   the electrical energy supply network receiving the feed power of the first network former at the feed voltage of the first network former, and
   adjusting the property of the feed voltage of the first network former to a specified value that is smaller than or equal to an actual value of a corresponding property of the network voltage resulting from the second static characteristic curves of the additional second network formers, when a limit for the feed power of the first network former is reached, said feed voltage of the first network former being applied to the electrical energy supply network after receipt of a predetermined switch-on signal, said property of the feed voltage of the first network former being sequentially controlled after receipt of the predetermined switch-on signal based on a desired curve, wherein the desired curve is ramp-shaped.

2. The method of claim 1, wherein the limit for the feed power of the first network former is reached when a maximum current that can be supplied to the supply network by the first network former is reached or a feed power of the first network former is negative, or both.

3. The method of claim 1, further comprising shifting a base of the first static characteristic curve to adjust the property of the feed voltage of the first network former to the specified value.

4. The method of claim 3, wherein for shifting the base, a supplied primary energy, from which the feed power of the first network former is converted, is reduced.

5. The method of claim 3, wherein the base of the first static characteristic curve is returned to its original value when the feed voltage of the first network former is smaller than the limit for the feed power of the first network former.

6. The method of claim 1, wherein the first static characteristic curve is linear, the method further comprising changing a slope of the first static characteristic curve to adjust the property of the feed voltage of the first network former to the specified value.

7. The method of claim 6, further comprising resetting the slope of the first characteristic curve to its original value when the feed voltage of the first network former is smaller than the limit for the feed power of the first network former.

8. The method of claim 1, wherein the switch-on signal is an increase of a property of the network voltage.

9. The method of claim 1, wherein the sequentially controlled property of the feed voltage of the first network former is the root-mean-square value of the feed voltage of the first network former.

10. The method of claim 1, wherein a length of time of the ramp-shaped desired curve is shorter than a transmission time of the predetermined switch-on signal.

11. A control device for synchronizing a feed voltage of a first current-limited network former with a network voltage of an electrical energy supply network comprising additional second network formers having second static characteristic curves and electrical loads, wherein the control device is configured to:
   determine, based on a first static characteristic curve of the first network former, a property of the feed voltage of the first network former, said property selected from frequency, phase position and root-mean-square value,
   compare with the first static characteristic curve of the first network former the determined property of the feed voltage of the first network former with a feed power of the first network former,
   supply to the electrical energy supply network the feed power of the first network former at the feed voltage of the first network former, and
   adjust the property of the feed voltage of the first network former to a specified value that is smaller than or equal to an actual value of a corresponding property of the network voltage resulting from the second static characteristic curves of the additional second network formers, when a limit for the feed power of the first network former is reached, said feed voltage of the first network former being applied to the electrical energy supply network after receipt of a predetermined switch-on signal, said property of the feed voltage of the first network former being sequentially controlled after receipt of the predetermined switch-on signal based on a desired curve, wherein the desired curve is ramp-shaped.

12. A current-limited network former for an electrical energy supply network having a network voltage, the network former having a static characteristic curve and comprising an energy generator supplying a feed voltage into the electrical energy supply network and a control device for synchronizing the feed voltage of the network former with the network voltage of the electrical energy supply network that includes additional network formers with additional static characteristic curves and loads, wherein the control device is configured to:
   determine, based on the static characteristic curve of the network former, a property of the feed voltage of the network former, said property selected from frequency, phase position and root-mean-square value,
   compare with the static characteristic curve of the network former the determined property of the feed voltage of the network former with a feed power of the network former,
   supply to the electrical energy supply network the feed power of the network former at the feed voltage of the network former, and
   adjust the property of the feed voltage of the network former to a specified value that is smaller than or equal to an actual value of a corresponding property of the network voltage resulting from the additional static characteristic curves of the additional network formers, when a limit for the feed power of the network former is reached, said feed voltage of the network former being applied to the electrical energy supply network after receipt of a predetermined switch-on signal, said property of the feed voltage of the network former being sequentially controlled after receipt of the predetermined switch-on signal based on a desired curve, wherein the desired curve is ramp-shaped.

13. The network former of claim 12, further comprising an energy store for receiving electrical energy from the electrical energy supply network.

14. The network former of claim 12, wherein the energy generator is an inverter configured to convert electrical energy from a DC source into the feed voltage.

15. An electrical energy supply network comprising;
- a plurality of network formers supplying respective electrical feed voltages for forming a network voltage, and
- at least one electrical load receiving the network voltage,
- wherein at least one of the plurality of network formers has a static characteristic curve and comprises an energy generator and a control device for synchronizing the feed voltage of the network former with the network voltage of additional network formers of the plurality of network formers that are located in the electrical energy supply network and include additional static characteristic curves and loads, and
- wherein the control device is configured to
- determine, based on the static characteristic curve of the at least one network former, a property of the feed voltage of the at least one network former, said property selected from frequency, phase position and root-mean-square value,
- compare with the static characteristic curve of the at least one network former the determined property of the feed voltage of the at least one network former with a feed power of the at least one network former,
- supply to the electrical energy supply network the feed power of the at least one network former at the feed voltage of the at least one network former, and
- adjust the property of the feed voltage of the at least one network former to a specified value that is smaller than or equal to an actual value of a corresponding property of the network voltage resulting from the additional static characteristic curves of the additional network formers, when a limit for the feed power of the at least one network former is reached, said plurality of feed voltages of the plurality of the network formers being applied to the electrical energy supply network after receipt of a predetermined switch-on signal, said property of the feed voltage of the at least one network former being sequentially controlled after receipt of the predetermined switch-on signal based on a desired curve, wherein the desired curve is ramp-shaped.

16. The electrical energy supply network of claim 15, wherein all network formers of the plurality of network formers are constructed in an identical manner as the at least one network former.

* * * * *